US011010916B2

(12) United States Patent
Eoh et al.

(10) Patent No.: US 11,010,916 B2
(45) Date of Patent: May 18, 2021

(54) METHOD OF CONFIGURING CAMERA POSITION SUITABLE FOR LOCALIZATION AND ROBOT IMPLEMENTING SAME

(71) Applicant: LG ELECTRONICS INC., Seoul (KR)

(72) Inventors: Gyuho Eoh, Seoul (KR); Jungsik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/550,392

(22) Filed: Aug. 26, 2019

(65) Prior Publication Data

US 2019/0378295 A1 Dec. 12, 2019

(30) Foreign Application Priority Data

Aug. 5, 2019 (KR) .................. 10-2019-0094827

(51) Int. Cl.
*G06T 7/00* (2017.01)
*G06T 7/70* (2017.01)
*G06T 7/80* (2017.01)
*G05D 1/00* (2006.01)
*G05D 1/02* (2020.01)
*H04N 5/225* (2006.01)
*H04N 5/232* (2006.01)
*H04N 5/247* (2006.01)

(52) U.S. Cl.
CPC ............ *G06T 7/70* (2017.01); *G05D 1/0094* (2013.01); *G05D 1/0251* (2013.01); *G06T 7/80* (2017.01); *G06T 7/97* (2017.01); *H04N 5/2253* (2013.01); *H04N 5/23299* (2018.08); *H04N 5/247* (2013.01); *G06T 2207/30242* (2013.01)

(58) Field of Classification Search
CPC .. G05D 1/0094; G05D 1/0251; G05D 1/0274; G06T 2207/30242; G06T 7/70; G06T 7/80; G06T 7/97; G06T 2207/30244; B25J 11/008; B25J 19/023; H04N 5/2253; H04N 5/2257; H04N 5/23299; H04N 5/247; H04N 5/2258; H04N 5/23216; H04N 5/23229
See application file for complete search history.

(56) References Cited

U.S. PATENT DOCUMENTS

2014/0350839 A1* 11/2014 Pack .................... G05D 1/0214
    701/409
2018/0012371 A1* 1/2018 Klingner ................. G06T 7/73
2019/0329418 A1* 10/2019 Sutherland .............. F41H 13/00

* cited by examiner

*Primary Examiner* — Anner N Holder
(74) *Attorney, Agent, or Firm* — KED & Associates LLP

(57) ABSTRACT

Disclosed herein are a method of configuring a camera position suitable for localization and a robot implementing the same, and the robot according to an embodiment, which configures a camera position suitable for localization, calculates a first SLAM index with respect to an image captured by a first camera sensor on a mounting unit, and calculates a second SLAM index by changing a position of the first camera sensor along the mounting unit, or selects any one of the first SLAM index and the second SLAM index by calculating the second SLAM index with respect to an image captured by a second camera sensor disposed in the mounting unit.

20 Claims, 11 Drawing Sheets

FIG. 3
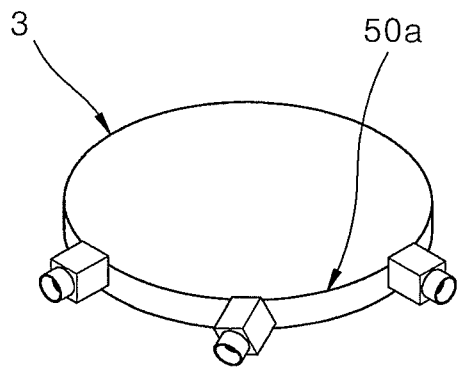
11
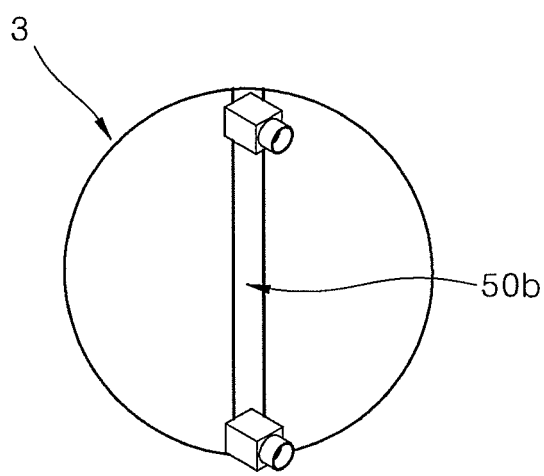
12
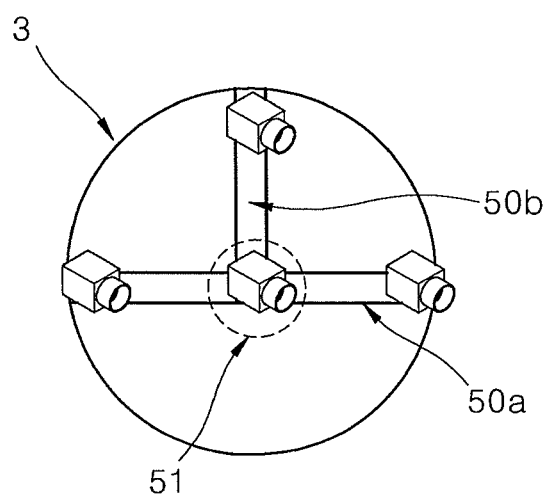
13

FIG. 7
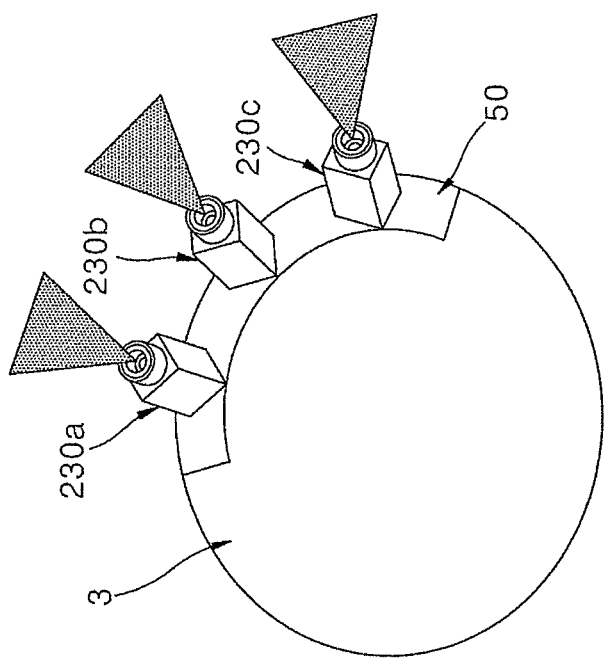
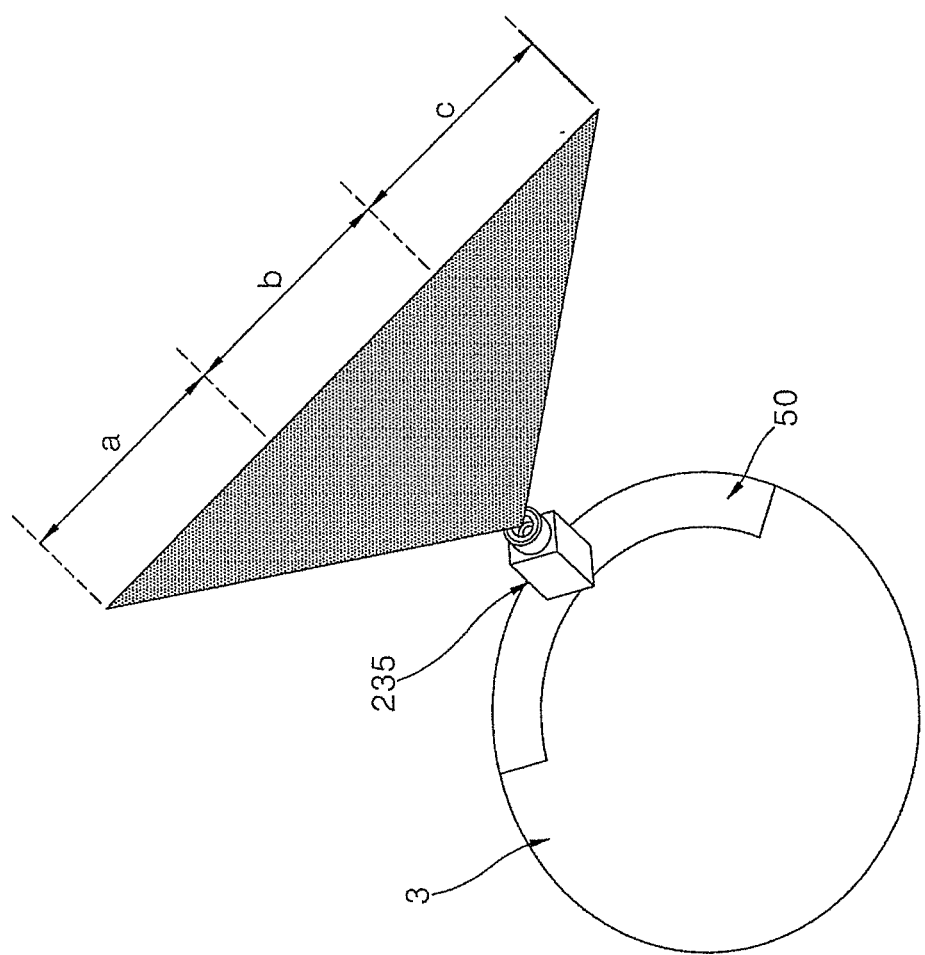

METHOD OF CONFIGURING CAMERA POSITION SUITABLE FOR LOCALIZATION AND ROBOT IMPLEMENTING SAME

CROSS-REFERENCE TO RELATED APPLICATION

This application claims priority under 35 U.S.C. § 119 to Korean Application No. 10-2019-0094827, filed on Aug. 5, 2019, whose entire disclosure is hereby incorporated by reference.

BACKGROUND

1. Field of the Invention

The present disclosure relates to a method of configuring a camera position suitable for localization and a robot implementing the same.

2. Description of Related Art

A large-scale retail store, a department store, an airport, a golf course, and the like, are places where exchange of goods and services takes place between people. Robots may be useful in the places for offering information and convenience to people.

Robots may be classified as guide robots, security robots, cleaning robots and the like. The robots move in a space, confirming their positions.

The robots are required for maintaining information on a space, on their current positions, on a path previously moved by the robots and the like such that the robots move confirming their positions and avoiding obstacles.

The robots may have maps to confirm their positions and to move. Additionally, the robots may perform visual simultaneous localization and mapping (SLAM) using cameras.

In order for the robots to enhance accuracy of visual SLAM, images captured by camera sensors have to be useful for recognizing of a position. To this end, the camera sensors may have an optimal direction or an optima angle for SLAM.

Accordingly, in this specification, a method of a robot configuring an adequate location of a camera sensor for estimating a location is described.

SUMMARY

As a means to solve the above-described problems, one objective of the present disclosure is to allow a robot to select an adequate position of a camera sensor for enhancing accuracy when the robot estimates a location.

Another objective of the present disclosure is to supply hardware components such that camera sensors change their positions, and to test adequate positions of cameras in various manners for visual SLAM performed by a robot.

Yet another objective of the present disclosure is to evaluate images captured by camera sensors of a robot, to determine adequate positions of the camera sensors for features of a space, and on the basis of the determined positions, to enhance visual SLAM performances.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

A robot which configures a camera position suitable for localization according to an embodiment select any one of a first SLAM index and a second SLAM index, wherein the robot calculate the first SLAM index with respect to an image captured by a first camera sensor on the mounting unit, and the robot calculates the second SLAM index by changing a position of the first camera sensor along the mounting unit or calculates the second SLAM index with respect to an image captured by a second camera sensor disposed in the mounting unit.

A robot which configures a camera position suitable for localization according to an embodiment changes a position of a camera sensor or changes weight of an image captured by a camera sensor on the basis of any one or more of a height of the ceiling, magnitude of illuminance, and speed of the robot in a space where the robot is moving, while the robot is moving.

A method of configuring a camera position suitable for localization according to an embodiment includes capturing images of a space in which a robot is moving by one or more camera sensors on a mounting unit onto which a plurality of camera sensors are mounted, or onto which a single camera sensor is movably mounted, calculating a first SLAM index with respect to an image captured by a first camera sensor on the mounting unit by a control unit of the robot, calculating a second SLAM index with respect to an image captured by a second camera sensor on the mounting unit by a control unit of the robot, and selecting any one of the first SLAM index and the second SLAM index by the control unit of the robot.

According to embodiments, an adequate configuration of a camera sensor, i.e., the position of a camera sensor, the number of camera sensors and the like, for recognizing and estimating a location by a robot may be selected in accordance with features of the robot and a space.

According to embodiments, the adequate positions of cameras may be tested in various manners for visual SLAM performed by a robot because camera sensors may change their positions on a robot and may supply hardware components.

According to embodiments, a robot may enhance accuracy of estimating a location by changing the location of a camera sensor or the configuration of a camera sensor in accordance with features of a space while the robot is moving.

Effects of the present disclosure are not limited to the above-described ones, and one having ordinary skill in the art to which the disclosure pertains may easily draw various effects from the configuration of the disclosure.

BRIEF DESCRIPTION OF THE DRAWINGS

FIG. 3 shows a configuration of a robot, in which a camera sensor on a mounting unit is disposed in various ways according to an embodiment.

FIG. 7 shows an area captured by a single high-performance camera sensor and an area captured by a plurality of camera sensors.

DETAILED DESCRIPTION

Figure 1:
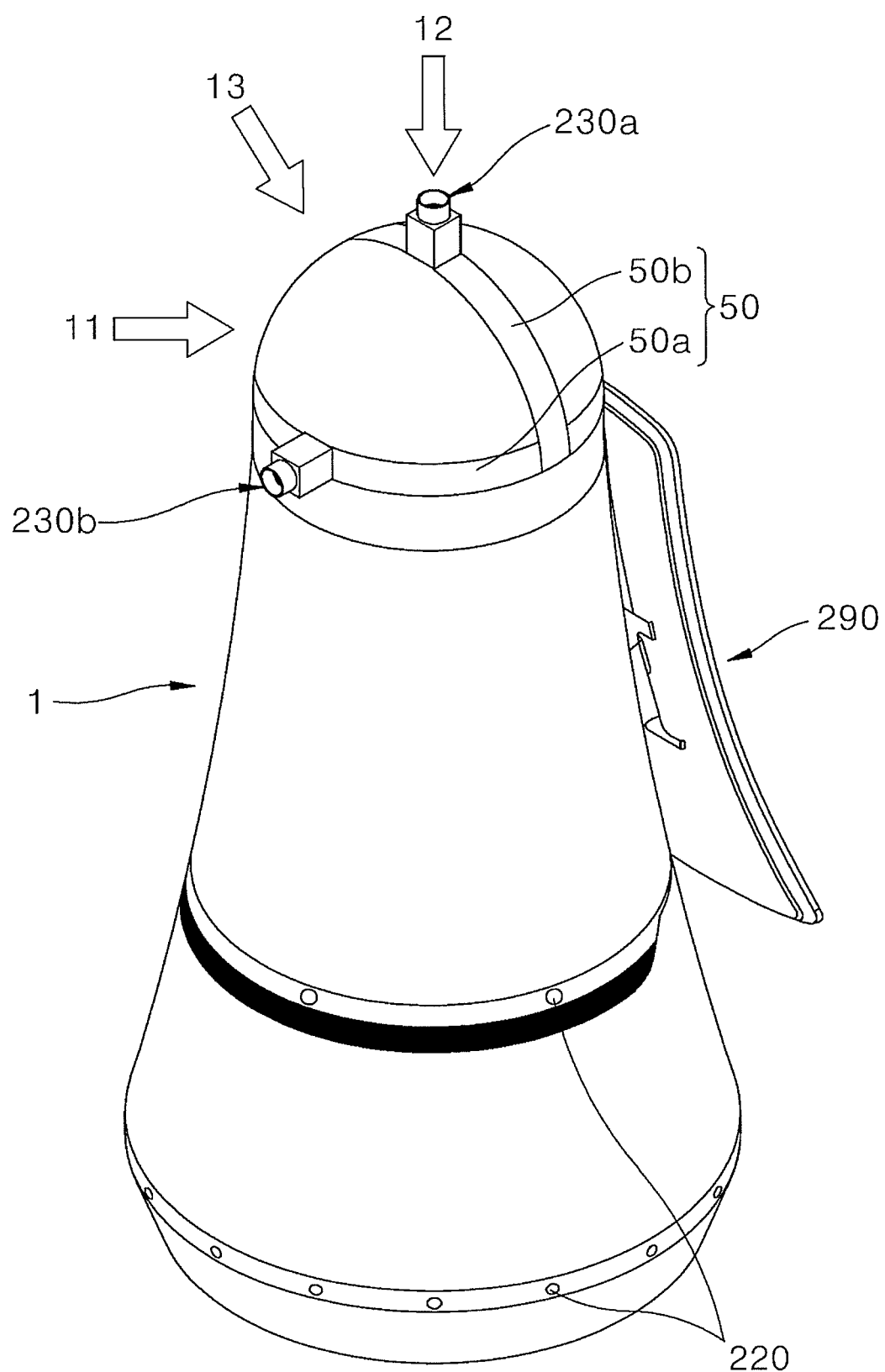
FIG. 1 shows an appearance of a robot according to an embodiment.

Hereinafter, embodiments of the present disclosure will be described in detail with reference to the drawings so that those skilled in the art to which the present disclosure pertains can easily implement the present disclosure. The present disclosure may be implemented in many different manners and is not limited to the embodiments described herein.

In order to clearly illustrate the present disclosure, technical explanation that is not directly related to the present disclosure may be omitted, and identical or similar components are denoted by an identical reference numeral throughout the specification. Further, some embodiments of the present disclosure will be described in detail with reference to the drawings. In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

In describing components of the present disclosure, it is possible to use the terms such as first, second, A, B, (a), and (b), etc. These terms are only intended to distinguish a component from another component, and a nature, an order, a sequence, or the number of the corresponding components is not limited by that term. When a component is described as being "connected," "coupled" or "connected" to another component, the component may be directly connected or able to be connected to the other component; however, it is also to be understood that an additional component may be "interposed" between the two components, or the two components may be "connected," "coupled" or "connected" through an additional component.

Further, with respect to embodiments of the present disclosure, for convenience of explanation, the present disclosure may be described by subdividing an individual component, but the components of the present disclosure may be implemented within a device or a module, or a component of the present disclosure may be implemented by being divided into a plurality of devices or modules.

In this specification, a robot includes moving devices that are used for specific purposes (cleaning, ensuring security, monitoring, guiding and the like) or that offer functions according to features of a space in which the robot is moving, hereunder. Accordingly, in this specification, devices that have transportation means capable of moving using predetermined information and sensors, and that offer predetermined functions are generally referred to as a robot.

In this specification, the robot may perform simultaneous localization and mapping (SLAM) to move autonomously in a space and to offer the predetermined functions that are described above. To perform SLAM, the robot may capture images of spaces in which the robot is moving, using camera sensors, and may create maps using the captured images, or may estimate the current location or position of the robot. As an example, the camera sensor is a camera acquiring images. The camera sensor includes stereo cameras, depth cameras and the like.

More pieces of image information result in increased accuracy of the estimation of location. In this case, the robot may excessively use computing resources. Accordingly, when the robot estimates a location, accuracy of SLAM may be enhanced by confirming an optimal direction or an optimal position of a camera sensor within computing resources supplied by the robot on the basis of the optimal direction or the optimal position.

To enhance accuracy of SLAM, the robot according to an embodiment may move a camera sensor physically to a specific position on the robot. Additionally, the robot may control a camera sensor such that the camera sensor faces a specific direction.

Further, the robot may determine whether an image captured by the camera sensor is appropriate for SLAM. When processes of changing/setting the position and direction of the above-described camera and of determining whether an image captured by the camera sensor is appropriate for SLAM are repeated, the robot may set an optimal position and direction of the camera sensor when performing SLAM.

Figure 2:
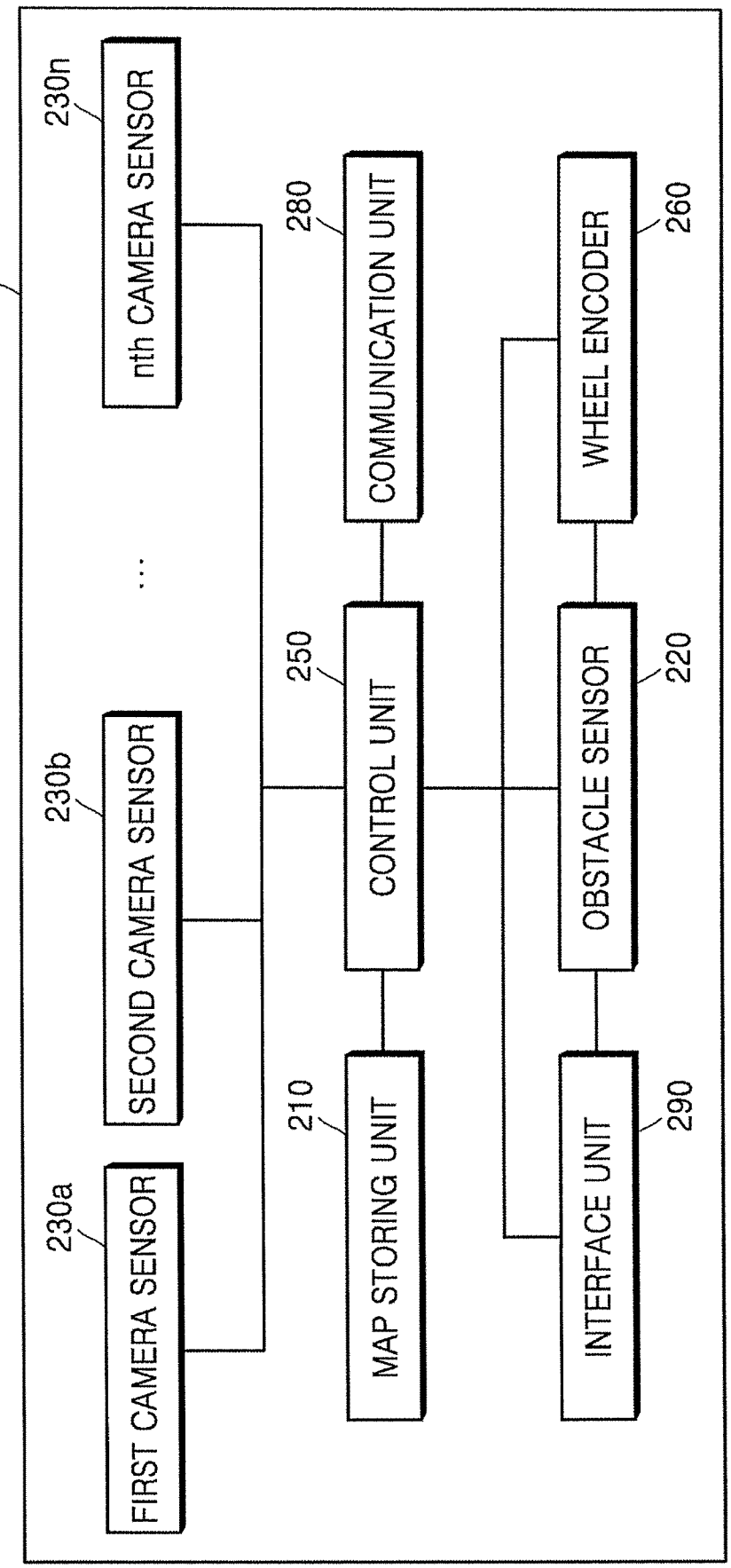
FIG. 2 shows a configuration of a control module that controls a robot according to an embodiment.

FIG. 1 shows an appearance of a robot according to an embodiment, and FIG. 2 shows a configuration of a control module that controls a robot according to an embodiment.

A robot 1 in FIG. 1 is used to determine an exact position of a camera sensor that will be installed in various robots. The robot 1 in FIG. 1 may be a test robot that selects optimal positions of camera sensors. Additionally, the robot 1 in FIG. 1 may be a driving robot that performs SLAM after an optimal position of a camera sensor is determined and the camera sensor is disposed.

To this end, a mounting unit 50, which is disposed on the robot 1 and to which a camera sensor is coupled, may be integrally coupled to the robot or may be detachably coupled to the robot.

The robot includes a mounting unit 50 coupled to a camera sensor 230*a*, 230*b* such that the camera sensor 230*a*, 230*b* may be disposed in various positions.

The camera sensor 230*a*, 230*b* may move on the mounting unit 50. For example, the mounting unit 50 may include an uneven portion or a groove or may be configured as a rail. The camera sensor 230*a*, 230*b* may move along the mounting unit 50 on the basis of control by a control unit 250 in a control module (150 in FIG. 2) of the robot 1, and may be disposed to face a specific position or a specific direction on the robot 1.

A plurality of camera sensors 230*a*, 230*b* may be disposed on the mounting unit 50, or a single camera sensor may be disposed on the mounting unit 50 and may be re-disposed in various positions on the mounting unit 50.

An interface unit 290 may be disposed on one lateral surface of the robot 1 such that results concerning SLAM performances on the basis of the position of a camera sensor are output.

Additionally, the robot 1 in FIG. 1 moves autonomously to adjust the position of a camera sensor while moving in a space. In order for the robot 1 to avoid obstacles during autonomous driving, various obstacle sensors 220 may be disposed at the lower end or the middle portion or anywhere else of the robot 1.

The robot 1 in FIG. 1 is a robot that generates information required for selecting an exact position of a camera sensor when other robots having the same appearance, specifically, the same portion, in which the mounting unit 50 is disposed, as that of the robot 1 perform SLAM (visual SLAM) using images. Accordingly, the robot 1 in FIG. 1 may perform visual SLAM directly after selecting the position of a camera, or may provide information on the position of a camera to another robot.

Further, the robot 1 may change the position of a camera while performing visual SLAM after selecting the position of the camera.

Reference numerals 11, 12, and 13 in FIG. 1 indicate directions facing the mounting unit 50 respectively, and movements of camera sensors from each viewpoint are specifically described with respect to FIG. 3.

FIG. 1 shows the mounting unit 50 disposed on the upper side of the robot. However, the present disclosure is not limited to what has been described. For example, the mounting unit 50 may be disposed at the height of the obstacle sensor 220 because a camera sensor may be disposed in the middle portion or at the lower end of the robot, where the obstacle sensor 220 is disposed. Accordingly, the mounting unit 50 that provides a moving path of a camera sensor such as a groove, a rail and the like may be disposed in an area indicated by reference numeral 220.

A configuration of a control module 150 that sets and adjusts movements of the robot 1 and the position of a camera sensor is described.

Like a computer or a processor, the control module 150 controls the robot 1. The control module 150 is disposed in the robot 1 and performs functions similar to those of a main processor. The control module 150 may interact with a user.

The control module 150 is disposed in the robot 1 to calculate an optimal position and direction of a camera sensor for SLAM using camera sensors mounted onto the robot 1. The control module 150 may be implemented as a software module, a chip in which a software module is implemented as hardware, and the like. Components constituting the control module 150 may be physically separated from the control module 150. For example, an obstacle sensor 220, a camera sensor 230 and an interface unit 290 may all be disposed outside the control module 150. However, operations of the obstacle sensor 220, the camera sensor 230 and the interface unit 290 may be controlled by the control module 150.

As an example, regular cameras are used as a plurality of camera sensors ($230a$, ..., $230n$) constituting the control module 150. Two or more camera sensors 230 may be used to overcome viewing angle limitations. Images captured in specific positions constitute vision information. That is, the camera sensors ($230a$, ..., $230n$) generate visual frames including vision information while capturing images of objects disposed outside the robot.

An interface unit 290 receives information from a user. The interface unit 290 receives various pieces of information such as a touch, a voice and the like from a user, and outputs results of input. Additionally, the interface unit 290 may output a map stored by the robot 1, or may output a process in which the robot is moving by overlapping the process with the map.

Further, the interface unit 290 may provide predetermined information to a user.

A communication unit 280 allows the robot 1 to communicate with another robot or an external server to receive and transmit information.

Additionally, the robot 1 may generate odometry information on the basis of rotations of wheels during movements of the robot. The odometry information is information on distances moved by the robot, which are calculated using frequencies of rotations of a wheel of the robot, a difference in frequencies of rotations of both wheels of the robot, and the like. A wheel encoder 260 in FIG. 2 generates odometry information by collecting information on rotations, directions, and the like of wheels constituting a moving unit of the robot, and supplies the odometry information to a control unit 250.

The moving unit comprised of wheels, caterpillars, and the like moves the robot.

An obstacle sensor 220 senses obstacles while the robot 1 is moving. Accordingly, the robot 1 may avoid the obstacles. For example, the obstacle sensor 220 may include a Time of Flight (TOF) sensor, an ultrasonic sensor, an infrared sensor, a depth sensor, a laser sensor, a LiDAR sensor, and the like. Sensors sense obstacles outside the robot 1 in various manners.

The control unit 250 controls the above-described components. Specifically, the control unit 250 controls the mounting unit 50, or the camera sensors ($230a$, ..., $230n$) coupled to the mounting unit 50 to move the camera sensors ($230a$, ..., $230n$) or to adjust angles of coverage of the camera sensors ($230a$, ..., $230n$).

Additionally, the control unit 250 may analyze an image captured by a camera sensor ($230a$, ..., $230n$) in a specific position, and may calculate accuracy when the image is applied during the process of estimating a position.

Thus, the control unit 250 may set the adequate positions, the adequate directions, the adequate number and the like of camera sensors for recognizing a position, i.e., for estimating a location.

The control unit 250 may control the positions of the mounting unit 50 and the camera sensors ($230a$, ..., $230n$) coupled to the mounting unit 50. Accordingly, accuracy in estimating a location on the basis of a configuration of a camera sensor in various positions on the robot 1 may be tested because the mounting unit 50 and the camera sensor ($230a$, ..., $230n$) may be physically re-disposed.

The control unit 250 may physically re-dispose the mounting unit 50 and the camera sensor ($230a$, ..., $230n$) and may determine whether the configuration of the camera sensor in the position is adequate for estimating a location. Thus, the control unit 250 may calculate an optimal position of the camera sensor ($230a$, ..., $230n$). Further, the control unit 250 may calculate the number of camera sensors.

The control unit 250 may determine a position in which a camera sensor extracts features most consistently when the robot performs visual SLAM, using data on images captured by the camera sensors.

The control module 150 may include a map storing unit 210. The map storing unit 210 stores a map including two or more visual frames captured by a camera sensor, and stores a relationship between the visual frames. As an example, a relationship between the frames includes wheel odometry information generated by the wheel encoder 260.

FIG. 3 shows a configuration of a robot, in which a camera sensor on a mounting unit is disposed in various ways according to an embodiment. For convenience of description, the appearance of the robot is omitted, and a state in which a camera sensor is disposed or moved on the mounting unit 50a, 50b is illustrated.

As illustrated in FIG. 1, one or more cameras may be disposed in the mounting unit 50a, 50b on the robot 1. A plurality of cameras may be disposed to simultaneously capture images for comparison of SLAM performances. Each camera's installed position or direction may be forward, rearward, upward, leftward, rightward positions, on the basis of a range in which the robot may move.

Each camera may move along the mounting unit 50a, 50b, and may be additionally disposed or removed. The mounting unit 50a, 50b and a camera may be coupled using a rail, a groove and the like. However, embodiments of the present disclosure are not limited to what has been described.

That is, each camera sensor may move along a specific groove constituting the mounting unit, and when necessary, a camera sensor may be added or the added camera sensor may be removed.

Reference numeral 11 in FIG. 3 shows a mounting unit 50a in the form of a horizontal rail, and illustrates the configuration of the mounting unit 50 in direction 11 of FIG. 1. Reference numeral 3 indicates a boundary line of a head portion of the robot on which the mounting unit 50a is disposed. In reference numeral 11, the mounting unit 50a is formed into a sort of rail. A camera sensor 230 may horizontally move along the mounting unit 50a.

Further, the camera sensors 230 may be respectively disposed in positions on the mounting unit 50 and may set a direction in which images are captured. The control unit 250 in configuration 11 of FIG. 3 may verify visual SLAM performances with respect to each image captured in each position and may select an optimal position.

Reference numeral 12 in FIG. 3 illustrates the configuration of the mounting unit 50b in direction 12 of FIG. 1. Reference numeral 3 indicates a boundary line of a head portion of the robot on which the mounting unit 50b is disposed. In reference numeral 12, the mounting unit 50b is formed into a sort of rail, and a camera sensor 230 may move along the mounting unit 50b. In reference numeral 12, the mounting unit 50b is disposed on the head of the robot, and a camera sensor may move along the mounting unit 50b or a plurality of camera sensors 230 may be disposed on the mounting unit 50b.

Reference numeral 13 in FIG. 3 illustrates the configuration of the mounting unit 50a, 50b in direction 13 of FIG. 1. Reference numeral 3 indicates a boundary line of a head portion of the robot on which the mounting unit 50a, 50b is disposed. In reference numeral 13, two sorts of mounting units 50a, 50b indicated by reference numerals 11 and 12 of FIG. 3 are combined.

Additionally, a camera sensor may move to a combined spot between the two mounting units 50a, 50b. Accordingly, a camera sensor moving along the mounting unit 50a may move to the mounting unit 50b. An enlarged configuration of reference numeral 51 is described in relation to FIG. 4.

The mounting unit 50 includes physical components such as a rail, a groove and the like to which a camera sensor may be coupled and which may move a camera sensor. Additionally, a camera sensor may move on the basis of control by the control unit 250 in the state of being coupled to the mounting unit 50.

As an example, a camera sensor and a mounting unit 50 may be engaged like the teeth of a saw and may move, or the control unit 250 may control a camera sensor and a mounting unit such that a coupling of the camera sensor and the mounting unit 50 may be maintained in a specific position while the camera sensor is moving on the mounting unit 50 using wheels.

Figure 4:
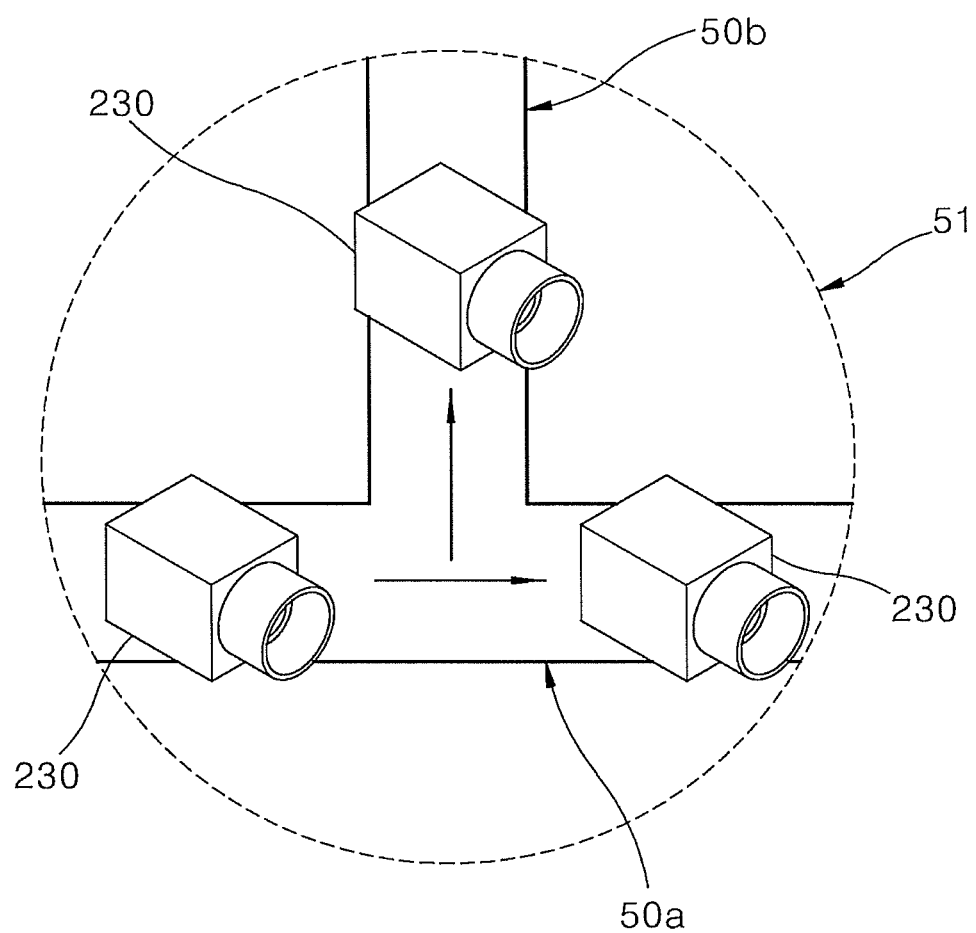
FIG. 4 shows a configuration in which a camera sensor moves at a spot where two mounting units are crossed according to an embodiment.

FIG. 4 shows a configuration in which a camera sensor moves at a spot where two mounting units are crossed according to an embodiment.

In FIG. 4, a camera sensor may move rightward along a horizontal mounting unit 50a or may move upward along a perpendicular mounting unit 50b at a spot where two mounting units 50a, 50b are crossed.

The present disclosure illustrates two mounting units 50a, 50b. However, more mounting units may be disposed. Additionally, the positions and number of camera sensors disposed in the robot 1 may vary on the basis of the positions and number of mounting units.

For example, when a single camera sensor is used, each image may be generated for each position. The control unit 250 moves and disposes the camera sensor in each position in each of the forward/rearward/sideward (leftward or rightward)/upward directions and the like. The control unit 250 may generate below-described SLAM indices using images captured by the camera sensor.

For example, when two camera sensors are used, each image may be generated for each position. The control unit 250 moves and disposes the two camera sensors in each position in each combination of the (forward+upward)/(forward+sideward (leftward or rightward))/(forward+rearward)/(sideward+upward)) directions and the like. The control unit 250 may generate below-described SLAM indices using images captured by the two camera sensors.

For example, when three camera sensors are used, each image may be generated for each position. The control unit 250 moves and disposes the three camera sensors in each position in each combination of the (forward+upward+sideward (leftward or rightward))/(forward+sideward (leftward and rightward))/(forward+rearward+upward) directions and the like. The control unit 250 may generate below-described SLAM indices using images captured by the three camera sensors.

For example, when four camera sensors are used, each image may be generated for each position. The control unit 250 moves and disposes the four camera sensors in each position in each combination of the (forward+upward+sideward (leftward and rightward))/(forward+upward+sideward (leftward and rightward)) directions and the like. The control unit 250 may generate below-described SLAM indices using images captured by the four camera sensors.

For example, when five camera sensors are used, each image may be generated for each position. The control unit 250 moves and disposes the five camera sensors in each position in each of the (forward+upward+rearward+sideward (leftward and rightward)) directions and the like. The control unit 250 may generate below-described SLAM indices using images captured by the five camera sensors.

Figure 5:
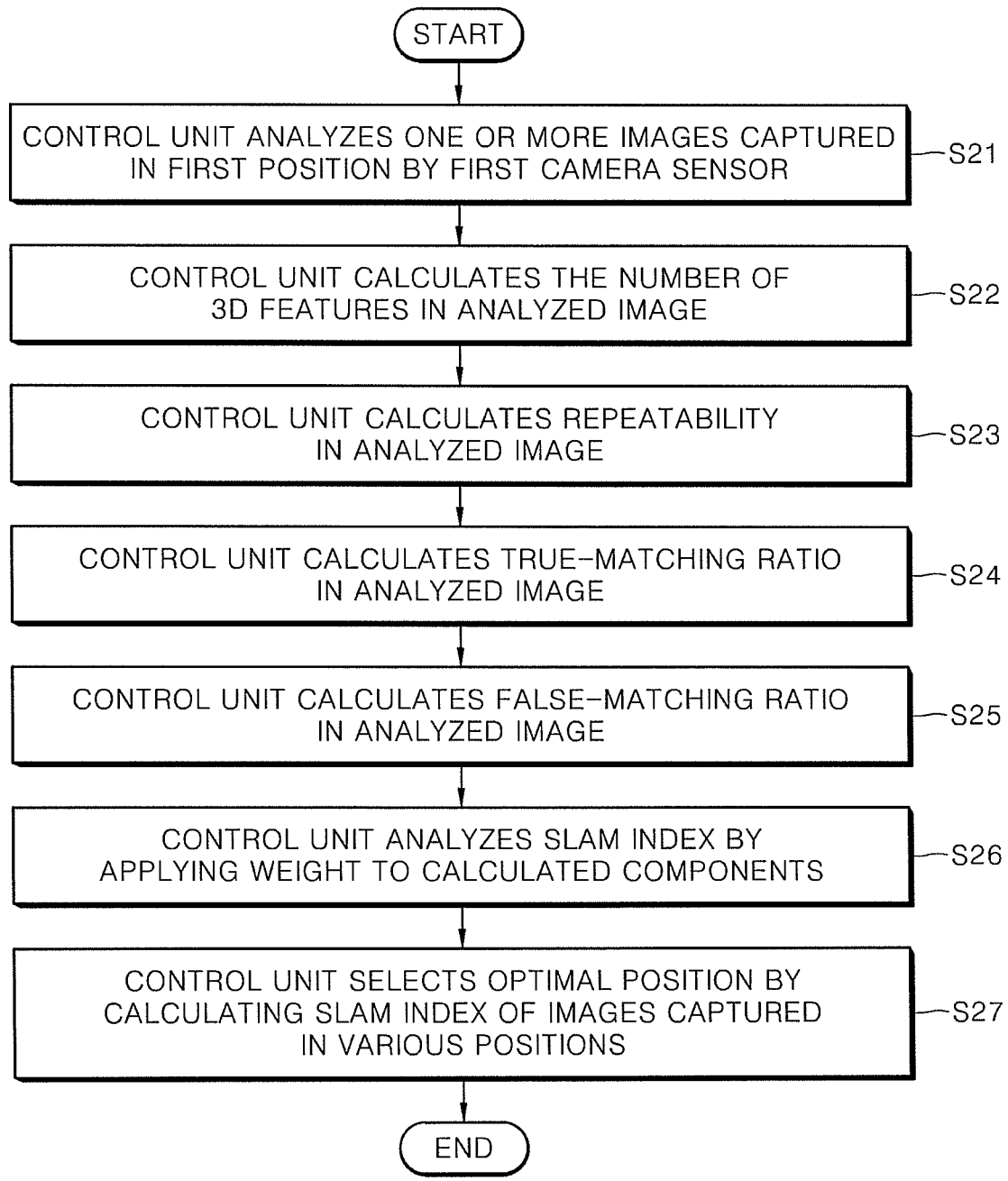
FIG. 5 shows a process of determining whether a camera sensor is disposed at an optimal position while the camera sensor performs SLAM according to an embodiment.

FIG. 5 shows a process of determining whether a camera sensor is disposed at an optimal position while the camera sensor performs SLAM according to an embodiment.

The control unit 250 evaluates SLAM indices using images captured by the camera sensors disposed in the mounting unit 50. The SLAM indices denote measurable points calculated on the basis of various features (qualities, characteristics) obtainable from images to determine whether the position of camera sensor is appropriate for SLAM using one or more (preferably two or more) images captured in a specific position.

The various features that are obtainable may denote repeatability that occurs between the number of three-dimensional points in a captured image and the image or may denote a true-matching ratio and a false-matching ratio calculated from an image.

The control unit 250 analyzes one or more images captured by a first camera sensor in a first position (S21). The first position denotes the position of a camera sensor on the mounting unit 50. Additionally, the first position also includes information on a specific direction in which a camera sensor faces in a specific position on the mounting unit 50.

Analyzing an image denotes extracting features from an image, confirming whether a large number of features are extracted during SLAM, or whether there are a large number of three-dimensional features, or whether a matching ratio is high and the like, on the basis of the extracted features, and calculating SLAM indices on the basis of what has been described.

Specifically, the control unit 250 calculates the number of three-dimensional features in the analyzed image (S22). The control unit 250 calculates the number of three-dimensional features acquired through triangulation using two-dimensional (2D) features. The number of three-dimensional features may be referred to as the number of 3D-points. The control unit 250 sets the calculated number to p1.

Additionally, the control unit 250 calculates repeatability (S23). Specifically, the repeatability denotes a ratio at which identical features are extracted from two or more images consistently. For example, repeated features are included between an image that is captured by the robot in spot A, and an image that is captured by the robot in spot B after the robot moves from spot A to spot B, on the basis of a distance from spot A to spot B.

That is, when features are extracted repeatedly and consistently, the robot enhances SLAM performance because the robot may confirm a movement between the two images. Accordingly, the control unit 250 sets a ratio at which identical features are extracted consistently to p2. As an example, p2 denotes a ratio of repeated feature points among entire feature points in each image.

Further, the control unit 250 calculates a true-matching ratio and sets the true-matching ratio to p3 (S24). p3 is a ratio at which matched feature points are true among entire feature points matched between the two images. p3 may be calculated as in the following formula 1.

$$p3 = \text{(the number of true-matching feature points)}/\text{(the total number of matched feature points)} \quad \text{[Formula 1]}$$

Furthermore, the control unit 250 calculates a false-matching ratio and sets the false-matching ratio to p4 (S25). P4 is a ratio at which matched feature points are false among entire feature points matched between the two images. p4 may be calculated as in the following formula 2.

$$p4 = \text{(the number of false-matching feature points)}/\text{(the total number of matched feature points)} \quad \text{[Formula 2]}$$

The control unit 250 applies weight to components calculated as the above-described p1 to p4, and calculates SLAM indices (S26). A SLAM index in position 1 is calculated as in formula 3.

$$\text{SLAM\_Index}(pos1) = w\_a*p1 + w\_b*p2 + w\_c*p3 + w\_d*p4 \quad \text{[Formula 3]}$$

As an example, w_a, w_b, and w_c may have a value of positive numbers, and w_d may have a value of negative numbers.

As an example, the control unit 250 takes weighted sums with respect to values calculated according to each standard and calculates SLAM indices for evaluating SLAM performances.

Influences of each index (p1 to p4) on evaluating SLAM performances are described as follows. Accordingly, the control unit 250 may adjust values of the above-described weight (w_a, w_b, w_c, and w_d) on the basis of characteristic elements of spaces in which the robot 1 performs SLAM.

As an example, p1 denotes the number of 3D points. During visual SLAM, a 2D-3D match is performed using 3D points to estimate the location of the robot 1. Accordingly, more 3D points generated, i.e., a higher p1 have a positive influence on visual SLAM performances.

Additionally, when the robot moves the same distance, and when the identical feature's movement change are large, there are more 3D points may be extracted with respect to an upward camera or a sideward camera.

Further, when there are more distinguishable features, more 3D points are generated. For example, 3D points may not be extracted from a white wall or a white ceiling.

P2 and p3 correspond to repeatability and a true-matching ratio respectively. A higher repeatability or a higher true-matching ratio of features acquired from an image has a positive influence on visual SLAM performances.

P4 corresponds to a false-matching ratio. False-matching ratio is results of a match between features are false. When a false-matching ratio is low, it has a positive influence on SLAM performances. Specifically, in an environment where there are a large number of repetitive patterns, a false-matching ratio is high, and due to w_d that is a value of negative weight, the total points are lowered.

Additionally, the control unit 250 calculates SLAM indices for each position by repeating steps 21 to 26 using images captured by a camera sensor in another position (S26). Further, each weight (w_a, w_b, w_c, and w_d) used to calculate SLAM indices may be previously set or may be re-set during repeated calculations.

The control unit 250 may determine quality of SLAM performances is higher when there are more 3D points (3D feature points), repeatability is higher, a true-matching ratio is higher, and/or a false-matching ratio is lower, as in formula 3.

Additionally, the control unit 250 calculates SLAM indices of images captured in various positions, and selects an optimal position (S27).

The control unit 250 sets a position (including a direction in which images are captured) of a camera sensor with the most excellent SLAM index as an optimal position of a camera sensor. In this case, the control unit 250 may give scores with respect to the same number of cameras. When more cameras are used, quality of performance is higher. Accordingly, SLAM indices may be calculated with respect to the same number of cameras, and among the SLAM indices, the optimal one may be calculated.

That is, according to an embodiment of FIG. 5, the control unit 250 may calculate an adequate position of a camera for visual SLAM as well as an adequate number of camera sensors for visual SLAM.

For example, the control unit 250 may compare an optimal SLAM index (SDX1) when a single camera sensor is used, and an optimal SLAM index (SDX2) when two camera sensors are used. Then the control unit 250 may determine the number of camera sensors.

For example, suppose that an average increase in SLAM indices is average_idx_gap when one camera sensor is added.

In this case, when a difference between SDX1 and SDX2 satisfies the conditions of the following formula 4, the control unit 250 determines that the optimal number of camera sensors for visual SLAM is two. Conversely, when a difference between SDX1 and SDX2 satisfies the conditions of the following formula 5, the control unit 250 determines that the optimal number of camera sensors for visual SLAM is one because visual SLAM performances may not be enhanced even when the number of camera sensors is set to 2.

$$SDX1 + average\_idx\_gap < SDX2 \quad \text{[Formula 4]}$$

$$SDX1 + average\_idx\_gap > SDX2 \quad \text{[Formula 5]}$$

The average increase of average_idx_gap may be previously set and may be adjusted on the basis of values that are calculated while the robot is moving.

The control unit 250, as described above, calculates SLAM indices concerning configurations of camera sensors such as the positions of camera sensors, the number of camera sensors and the like to evaluate SLAM performances, and on the basis of evaluated SLAM performances, may provide information required for determining adequate configurations of cameras for SLAM.

Indices such as p1 to p4 in FIG. 5 may be optionally applied.

The control unit 250 determines that a configuration of each camera appropriate for a match between features is advantageous for SLAM. Additionally, the control unit 250 may reflect the information, in which a large number of false matches due to a large number of repeated patterns adversely affect SLAM, in SLAM indices.

Next, when camera sensors are disposed in all the positions of the mounting unit 50 in a configuration in which a plurality of camera sensors are disposed in the mounting unit 50 of the robot, configurations of camera sensors, which may be selected increase. However, it takes much time and effort to test all the configurations. Accordingly, the robot 1 may include camera sensors of high resolution or a high field of view (FOV) such that a camera sensor in a specific position captures images in place of camera sensors in various positions, to select a camera configuration in an optimal position.

The above-described camera sensor may be a high-performance camera sensor, and may be mounted only onto a test robot. That is, the high-performance camera sensor may not be mounted onto all robots. The high-performance camera sensor may be mounted only onto a test robot, and may be used only to select the position of a camera sensor because a high resolution/high FOV camera sensor may capture images in various ranges with no movement in the positions of camera sensors. Accordingly, accuracy in configurations of cameras may be determined in various manners.

That is, a camera sensor, installed in a robot to select an optimal position of a camera for visual SLAM, may be a camera sensor having a resolution or FOV higher than that of camera sensors installed in other robots. In this case, a high-performance camera sensor is disposed in a specific position, and images, which may be captured in a position different from the specific position, may be acquired through the high-performance camera sensor.

In summary, the control unit 250 calculates a first SLAM index with respect to an image captured by a first camera sensor on the basis of the position of a camera sensor on the mounting unit 50. Additionally, the control unit 250 may calculate a second SLAM index by changing the position of the first camera sensor along the mounting unit 50, or may calculate a second SLAM index with respect to an image captured by a second camera sensor (a camera sensor different from the first camera sensor) disposed in the mounting unit 50.

Additionally, the control unit 250 selects any one of the first SLAM index and the second SLAM index, and calculates an optimal position of a camera sensor. As an example, the position calculated by the control unit 250 includes a position in which a camera sensor is disposed. Further, the position calculated by the control unit 250 may include a position in which a camera sensor is disposed as well as a direction angle of a camera sensor for capturing images.

That is, the control unit 250 may calculate a new SLAM index by moving a camera sensor, or may calculate a new SLAM index using another camera sensor disposed on the mounting unit 50. Additionally, the control unit 250 determines an optimal position of a camera sensor by comparing SLAM indices calculated according to each position.

In this process, the control unit 250 outputs position information on a camera sensor corresponding to a selected SLAM index to an interface unit 290. For example, when selecting a SLAM index, which enhances accuracy of SLAM, among a first SLAM index and a second SLAM index after calculating the first SLAM index or the second SLAM index on the basis of the positions of two camera sensors, the control unit outputs position information on a camera sensor corresponding to the selected SLAM index to the interface unit 290 to apply the position information to other robots.

Figure 6:
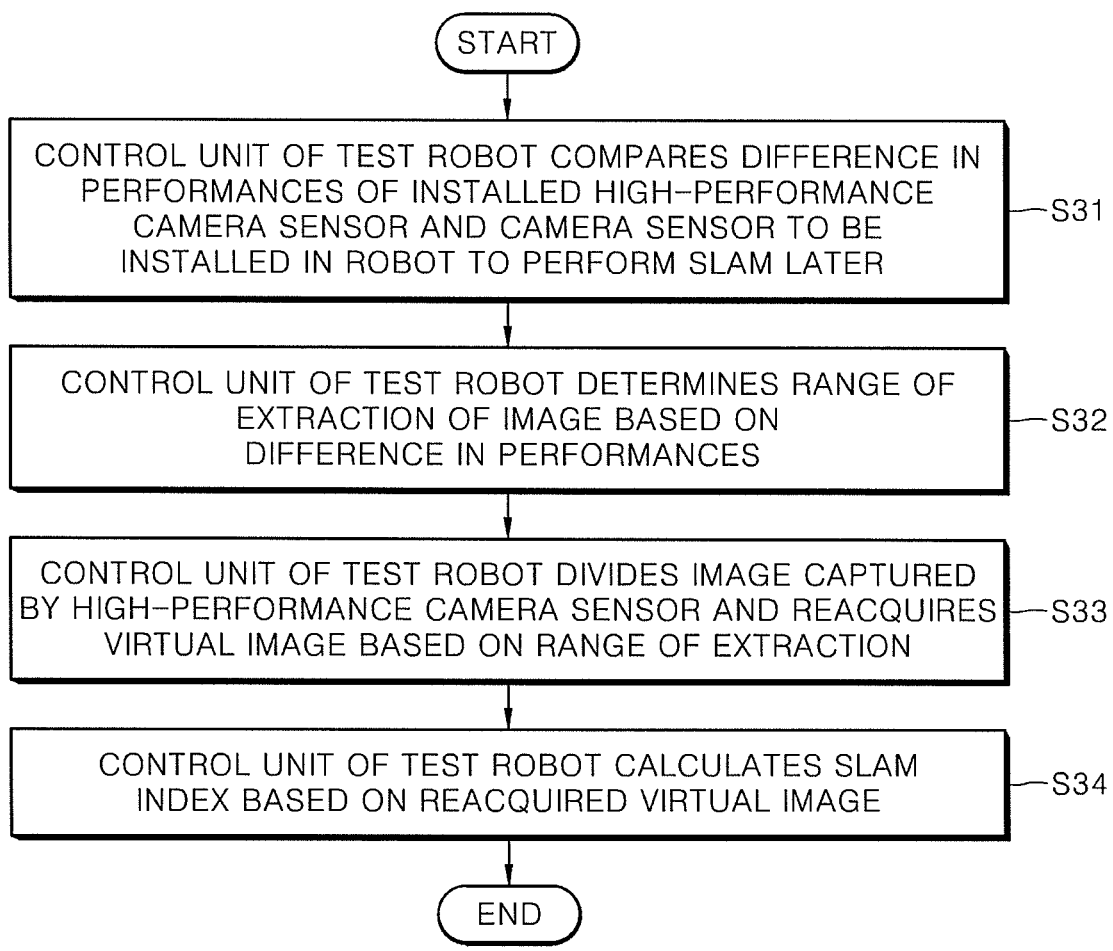
FIG. 6 shows a process of selecting an optimal position using a high-performance camera sensor according to an embodiment.

FIG. 6 shows a process of selecting an optimal position using a high-performance camera sensor according to an embodiment, and FIG. 7 shows an area captured by a single high-performance camera sensor and an area captured by a plurality of camera sensors.

In FIGS. 6 and 7, the control unit 250 divides an image captured by a camera sensor, and generates a first image corresponding to a first virtual camera sensor, and a second image corresponding to a second virtual camera sensor. Additionally, the control unit 250 may generate a SLAM index with respect to the first image and the second image respectively. In this case, a single high-performance camera sensor may cover directions of a plurality of camera sensors and images captured by a plurality of camera sensors. This is an example in which an image captured by a single high-performance camera sensor is divided into images captured by a plurality of camera sensors.

In FIG. 6, the control unit of a robot (test robot), which selects an optimal position of a camera sensor, may re-acquire a virtual image from images captured by a high-performance camera sensor installed in the test robot, and may calculate a SLAM index corresponding to each image.

The control unit 250 of the test robot compares performance between a high-performance camera sensor installed in the test robot and a camera sensor that will be disposed in a robot which will perform SLAM later (S31). As an example, the high-performance camera sensor (235 in FIG. 7) is a high resolution and high FOV camera as illustrated in 35 in FIG. 7. Reference numeral 36 in FIG. 7 shows a mounting unit 50 of a robot that will perform SLAM, and three camera sensors disposed in the mounting unit 50

The control unit 250 of the test robot confirms performance (resolution, and field of view) of a camera sensor (230a, 230b, and 230c in FIG. 7) that will be disposed in a robot which will perform SLAM. In this case, resolution of the high-performance camera sensor has to be higher than that of a camera sensor that will be disposed in a robot which will perform SLAM. Additionally, a field of view of the high-performance camera sensor has to be higher than that of a camera sensor that will be disposed in a robot which will perform SLAM.

Additionally, the control unit 250 of the test robot determines a range in which an image is extracted, on the basis of a difference in performance (S32). As in FIG. 7, the control unit may divide an area captured by the high-performance camera sensor 235 into areas of a, b, and c, and may connect the areas of a, b, and c to each of the camera sensors (230a, 230b, and 230c in 36 of FIG. 7).

The control unit 250 of the test robot divides an image captured by the high-performance camera sensor on the basis of a range in which an image is extracted, and re-acquires a virtual image (S33). When the high-performance camera sensor 235 captures a single image in the upper direction and the forward direction, the image is divided into three pieces.

The control unit 250 supposes that each divided image is an image captured by each camera sensor (230a, 230b, and 230c in FIG. 7).

That is, the control unit 250 of the test robot may virtually acquire an image that can be captured by a camera of a robot that will perform SLAM, on the basis of resolution and FOV acquired by the high-performance camera sensor 235. Certainly, in this process, the control unit 250 may further perform comparison between an image previously captured by a camera of the SLAM-performing robot, and an image captured by the high-performance camera sensor 235.

For example, the high-performance camera sensor 235 of the test robot may generate an image with resolution of 2560×1920, and may have a 160-degree FOV. Additionally, three camera sensors (230a, 230b, and 230c in 36 of FIG. 7) may generate an image with resolution of 640×480 and may have a 70-degree FOV.

The control unit 250 of the test robot may divide an image captured by the high-performance camera sensor 235 into three pieces with respect to angles (10, 45, and 70 degrees) at which the three camera sensors (230a, 230b, and 230c in 36 of FIG. 7) face. Additionally, the control unit 250 may calculate a SLAM index respectively with respect to each of the three divided images. The SLAM index is calculated as a SLAM index for each camera sensor indicated respectively by 230a, 230b, and 230c. The control unit 250 may select an optimal position of a camera sensor on the basis of the calculated SLAM index.

That is, the control unit 250 acquires images virtually that will be captured by camera sensors which will be mounted onto each robot that will perform SLAM, using information on a high resolution and high FOV image captured by the high-performance camera sensor 235. Additionally, the control unit 250 may calculate a SLAM index with respect to the virtual images.

Figure 8:
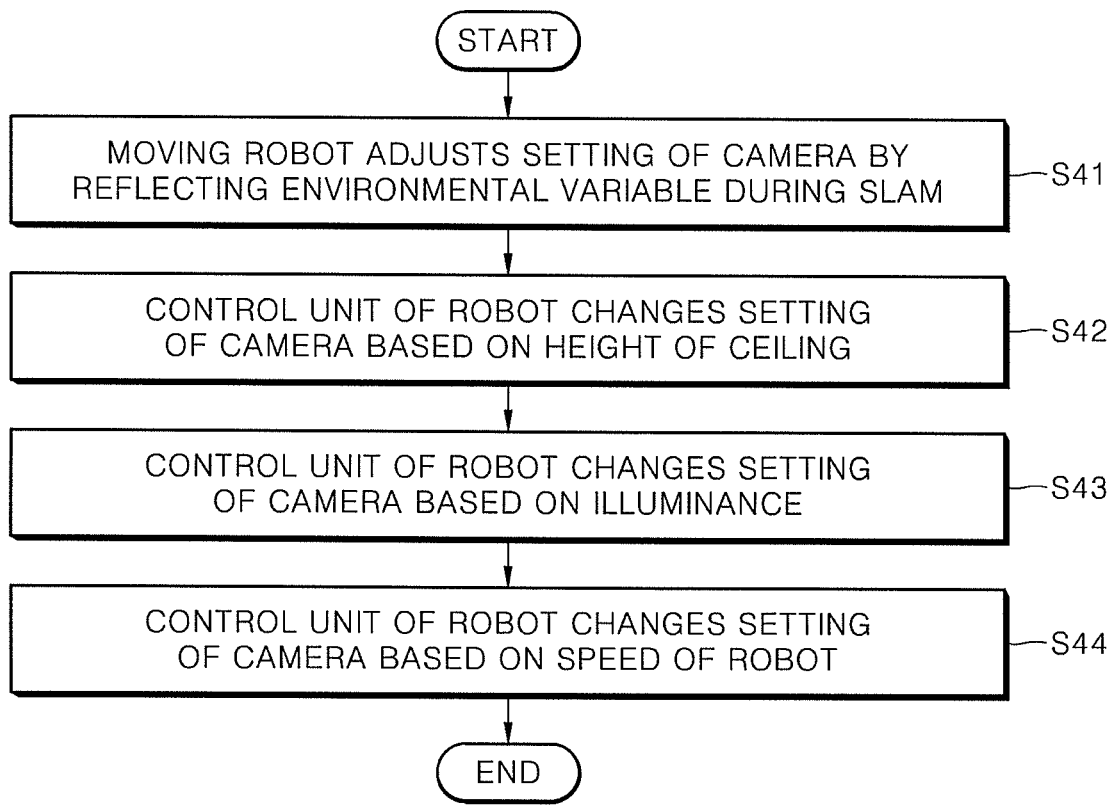
FIG. 8 shows a process in which a robot moving changes a configuration of a camera according to an embodiment.

FIG. 8 shows a process in which a robot moving changes a configuration of a camera according to an embodiment.

An optimal configuration of a camera sensor, selected according to the above-described embodiments, may be set differently while the robot performs SLAM. As an example of a change in the set configuration of a camera sensor, the positions of camera sensors may be changed, or weight that is used when images captured by camera sensors are applied to SLAM may be set differently.

For example, while performing SLAM, the robot moving may adjust the setting of a camera, by reflecting environmental variables and by changing the weight of an image, calculated by each camera sensor, or by changing the position of the camera itself (S41). When a SLAM index in the above-described formula 3 is below a certain level, the control unit 250 may determine a currently set configuration of a camera sensor is inappropriate for SLAM, and may re-set a position/image weight and the like.

As an example, the control unit 250 may change the setting of a camera on the basis of a height of the ceiling (S42). The control unit 250 may estimate a height of the ceiling in an actual environment where the robot is moving. For instance, the control unit 250 may approximately estimate a height of the ceiling through value Z of a 3D point extracted from an image captured by a camera sensor.

When the ceiling is too high, an error value of a 3D point of an image captured in the upward direction facing the ceiling is too large, so the image is not useful for enhancing accuracy of SLAM. Accordingly, the control unit 250 may determine sideward (forward, rearward, leftward and rightward) camera sensors are more accurate than an upward camera sensor.

In this case, the control unit 250 may move the camera sensor disposed in the upward direction to a sideward direction, or may increase weight of an image generated by a sideward camera sensor. The control unit 250, as described above, enhances accuracy of SLAM by re-adjusting a configuration (positions or weight of images and the like) of a camera sensor in a specific area.

Next, the control unit 250 may change the setting of a camera on the basis of illuminance (S43). The control unit 250 calculates intensity in an image acquired by a camera sensor. That is, the control unit 250 may calculate intensity of an image supplied by a camera sensor and may set weight of a configuration of the camera in a direction in which the intensity is a certain threshold or greater.

For example, when intensity of an image acquired by a camera sensor photographing a sideward direction is very low, and when intensity of an image acquired by a camera sensor photographing the upward direction is very high, the control unit 250 re-adjusts the setting of the camera sensors, by increasing weight of the image generated by the camera sensor disposed in the upward direction, or by moving the camera sensor disposed in the sideward direction such that the camera sensor faces the upward direction, and the like, to enhance accuracy of SLAM.

Additionally, the control unit 250 may change the setting of a camera on the basis of speeds of the robot (S44). When the speed of the robot is very low, there is a small difference between images captured in the forward and rearward directions. The images are not useful for SLAM. Accordingly, the control unit 250 gives weight to a configuration of a leftward and rightward or upward camera. For example, the control unit 250 increases weight of an image captured by a leftward and rightward/upward camera sensor, or moves the position of a camera sensor in the leftward and rightward or straight upward direction.

Conversely, when the speed of the robot is very high, forward and rearward and upward images are blurred due to a high speed of the robot. Accordingly, the control unit 250 gives weight to configurations of forward and rearward cameras.

For example, the control unit 250 increases weight of images captured by forward and rearward camera sensors, or moves the position of the camera sensor in the forward or rearward direction.

As illustrated in FIG. 8, an optimal configuration of a camera may be changed in real time on the basis of features of an environment where the robot is moving and on the basis of states of the robot. Additionally, the control unit 250 may perform SLAM, changing a configuration of a camera during driving according to weight of the configuration of the camera.

According to the above-described embodiments, the robot may select an optimal position of a camera sensor when performing visual SLAM. Specifically, camera-based visual SLAM is a method in which features are extracted on the basis of image information, and locations are estimated on the basis of the extracted features. Accordingly, the number of generated features and SLAM performances may vary on the basis of acquired images of spots in an external space.

The control unit 250, as described in FIG. 5, may extract meaningful features repeatedly from an image, and may select a position where the features are matched well as a position where a camera sensor is disposed.

A big difference between features that are matched while the robot is moving leads to a high-quality SLAM performance. Accordingly, the robot captures an image of a space where there is such a big difference and performs SLAM in a space, thereby enhancing accuracy of recognition.

As an example, a difference in features of an image captured by a camera installed in the robot to face the upward (ceiling-view) direction may be bigger than that in features of an image captured by a camera installed in the robot to face the forward (front-view) direction. In this case, locations may be readily estimated because an influence of matching error in the upward direction rather than the forward direction is reduced.

However, the features may vary according to features of spaces. For example, a space has a ceiling with repetitive patterns and lateral surfaces with animal patterns. In this case, comparing images on the ceiling is not useful for recognizing a position.

According to embodiments of the present disclosure, when SLAM indices are calculated through configurations of cameras using a test robot in a target environment, and the control unit 250 calculates an optimal configuration of a camera (the position of a camera, the number of cameras), a camera sensor may be disposed on the robot on the basis of the optimal configuration.

To this end, the mounting unit 50 is disposed on the robot 1 to test various configurations of cameras. The mounting unit 50 and a camera sensor may be coupled or detached, and the camera sensor may move along the mounting unit 50.

As illustrated in FIGS. 5, 6, 7 and the like, acquired images may be processed on the basis of various configurations of camera sensors, SLAM performances may be verified, and optimal configurations of cameras may be selected. When SLAM indices are calculated with respect to images captured by camera sensors in various positions, accuracy of SLAM of each camera sensor may be determined on the basis of features included in the images.

In summary, in the process of FIG. 8, the control unit 250 may change the position of a camera sensor or weight of an image captured by a camera sensor on the basis of any one or more of a height of the ceiling, magnitude of illuminance, or speed of the robot in a space where the robot is moving, while the robot is moving.

Figure 9:
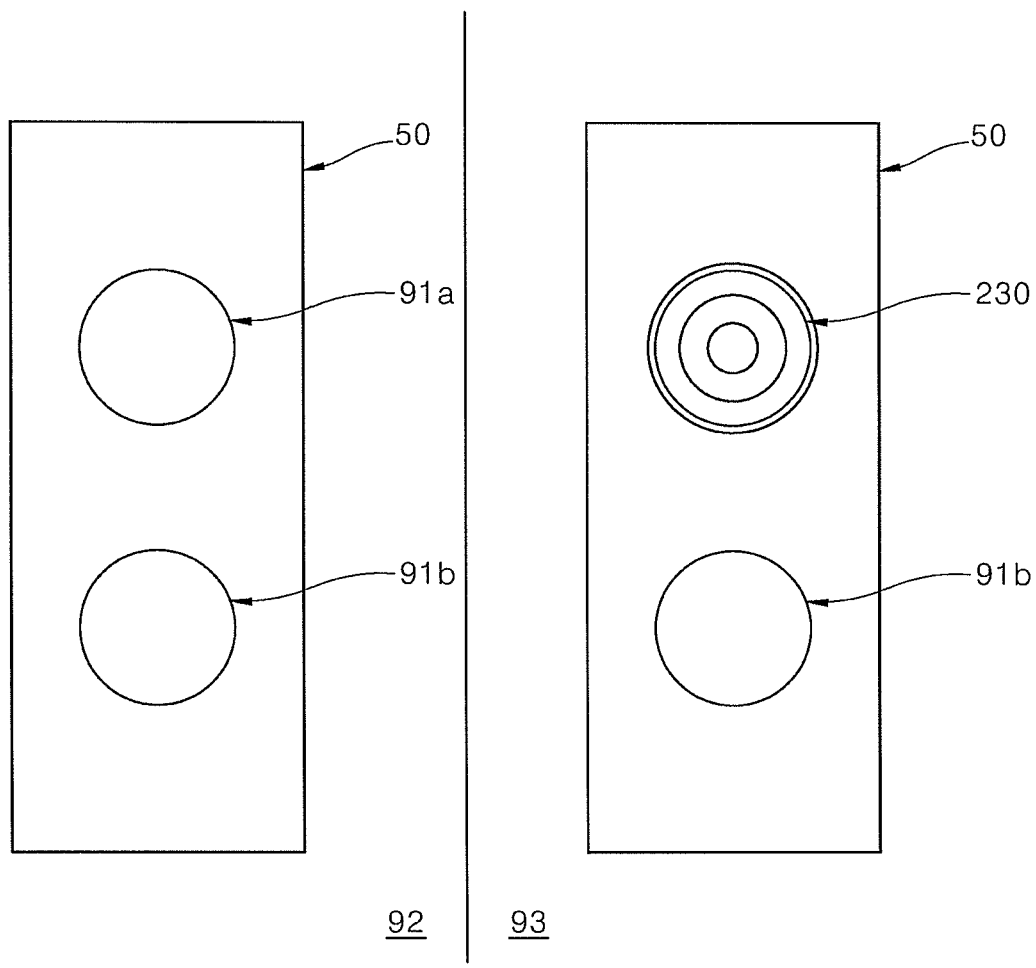
FIG. 9 shows a position sensing unit disposed in a mounting unit according to an embodiment.

FIG. 9 shows a position sensing unit disposed in a mounting unit according to an embodiment. A plurality of position sensing units 91a, 91b are disposed in the mounting unit 50, and sense a state in which a camera sensor 230 is disposed. That is, the position sensing units may confirm the position of a camera sensor and may be disposed on the rail of the mounting unit 50. Accordingly, the control unit 250 determines that camera sensors are not disposed in two position sensing units 91a, 91b respectively in state 92.

In state 93, a camera sensor 230 is disposed on a first position sensing unit 91a. Accordingly, the control unit 250 sets a position of the camera sensor using position information corresponding to the first position sensing unit 91a.

Figure 10:
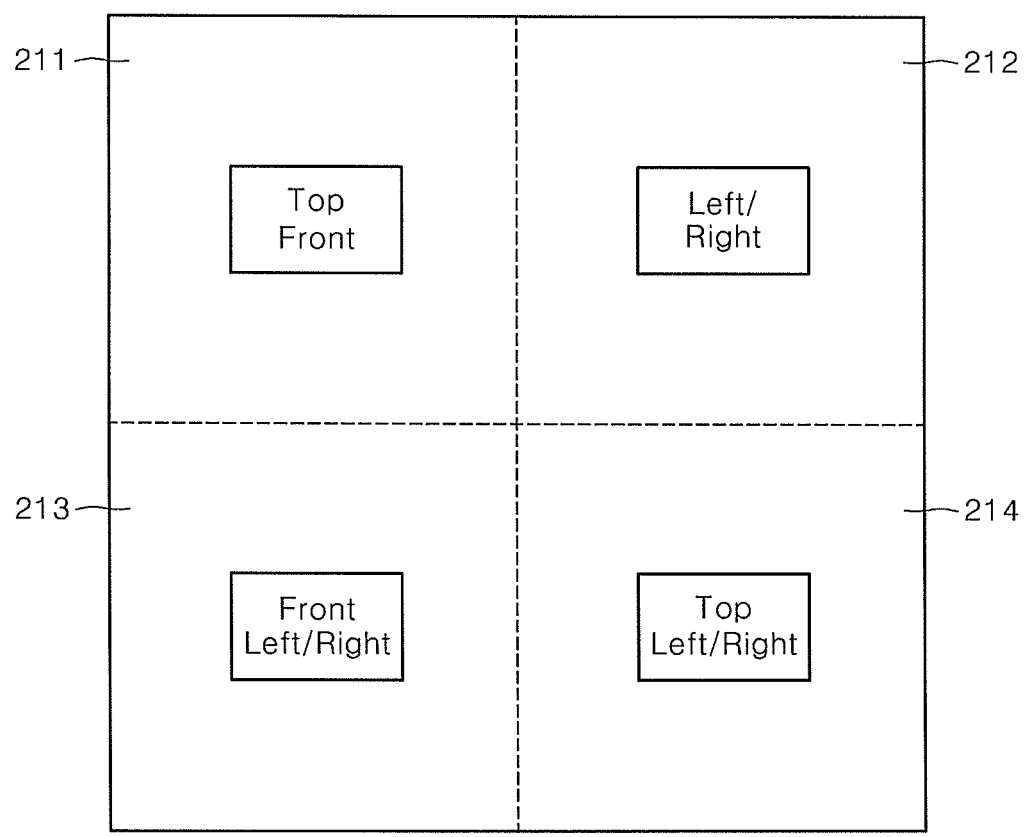
FIG. 10 shows an example in which an optimal configuration of a camera sensor is provided for each space and relevant information is stored in a map according to an embodiment.

FIG. 10 shows an example in which an optimal configuration of a camera sensor is provided for each space and relevant information is stored in a map according to an embodiment.

An optimal position of a camera sensor may vary according to physical features of spaces in which the robot is moving. FIG. 10 shows map 210a information on a space, and areas 211, 212, 213, and 214 denote subordinate areas constituting a space respectively.

Each area includes optimal position information on a camera sensor. An upward-forward camera sensor is disposed in area 211, a sideward camera sensor is disposed in area 212, a forward-sideward camera sensor is disposed in area 213, and an upward-sideward camera sensor is disposed in area 214.

Accordingly, the robot 1 may adjust a camera sensor such that the camera sensor faces the upward-forward direction in area 211 while moving a space that is stored as map information in map 210a. Additionally, the robot 1 moves the position of the camera sensor in the upward-sideward direction when moving to area 214.

That is, the control unit 250 divides a space in which the robot is moving into a first area and a second area (210a). Additionally, the control unit 250 differently generates a configuration of a camera sensor configured in the first area and a configuration of a camera sensor configured in the second area. As in FIG. 10, configurations of camera sensors generated differently for each area may be changed when the robot is moving to a corresponding area.

In a driving robot that performs SLAM, a map storing unit 210 may store images captured by camera sensors. The robot may perform SLAM using the images stored in the map storing unit.

Additionally, as illustrated in FIG. 8, the control unit 250 may change the position of a camera sensor or may change weight of an image captured by a camera sensor on the basis of any one or more of a height of the ceiling, magnitude of illuminance, and speed of the robot in a space in which the robot is moving by reflecting features of a surrounding environment of the space.

To this end, a robot moving may also be equipped with a mounting unit. Additionally, the control unit 250 may move a camera sensor in the state in which the camera sensor is coupled to the mounting unit on the basis of features of an environment. Likewise, a robot moving may also include a position sensing unit of FIG. 9.

Figure 11:
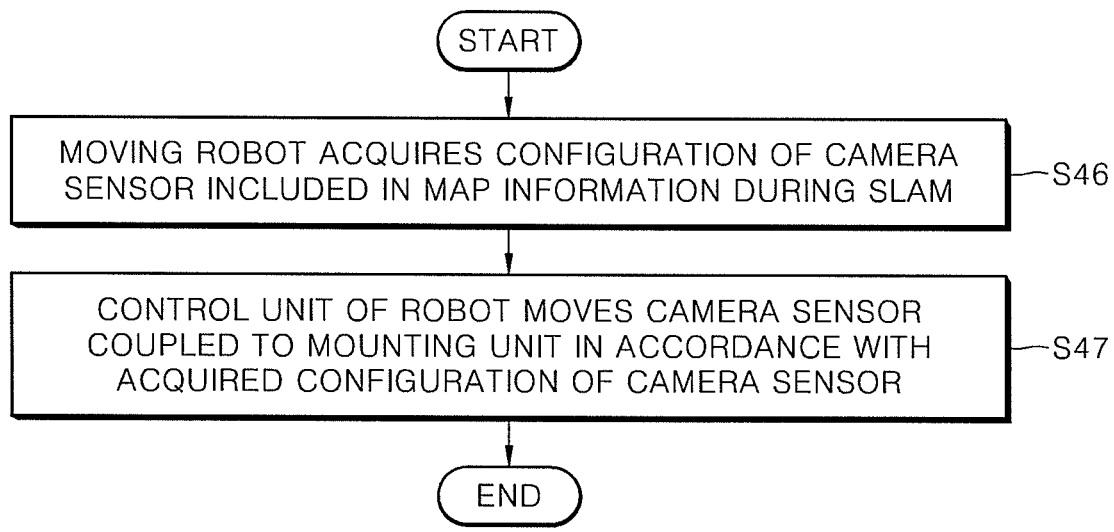
FIG. 11 shows a process in which a robot moving changes a configuration of a camera sensor while the robot is moving according to an embodiment.

FIG. 11 shows a process in which a robot moving changes a configuration of a camera sensor while the robot is moving according to an embodiment.

The robot moving acquires a configuration of a camera sensor, which is included in map information while performing SLAM (S46). In this process, map information 210a of FIG. 10 is acquired. Additionally, the control unit 250 of the robot moves the camera sensor coupled to the mounting unit in accordance with the acquired configuration of the camera sensor.

That is, the map storing unit 210 may divide a space in which the robot is moving into a first area and a second area, and may store a configuration of a camera sensor set in the first area and a configuration of a camera sensor set in the second area in a different manner. Additionally, the control unit 250 may move the camera sensor coupled to the mounting unit in accordance with the configuration of the camera sensor stored the map storing unit when comparing pieces of map information stored in the map storing unit 210 during SLAM.

Although in embodiments, all the elements that constitute the embodiments of the present disclosure are described as being coupled to one or as being coupled to one so as to operate, the disclosure is not limited to the embodiments. One or more of all the elements may be optionally coupled to operate within the scope of the present disclosure. Additionally, each of the elements may be implemented as single independent hardware, or some or all of the elements may be optionally combined and implemented as a computer program that includes a program module for performing some or all of the combined functions in single hardware or a plurality of hardware. Codes or segments that constitute the computer program may be readily inferred by one having ordinary skill in the art. The computer program is recorded on computer-readable media and read and executed by a computer to implement the embodiments. Storage media that store computer programs includes storage media magnetic recording media, optical recording media, and semiconductor recording devices. Additionally, the computer program that embodies the embodiments includes a program module that is transmitted in real time through an external device.

The embodiments of the present disclosure have been described. However, the embodiments may be changed and modified in different forms by one having ordinary skill in the art. Thus, it should be understood that the changes and modifications are also included within the scope of the present disclosure.

What is claimed is:

1. A robot which configures a camera position suitable for localization, comprising:
   a moving unit configured to move a robot;
   one or more camera sensors configured to capture images of a space in which the robot is moving:
      a mounting unit disposed on the robot and coupled with the camera sensor; and
      a control unit configured to select any one of a first SLAM index and a second SLAM index, wherein the control unit is configured to calculate the first SLAM index with respect to an image captured by a first one of the camera sensors on the mounting unit, and wherein the control unit calculates the second SLAM index by changing a position of the first one of the camera sensors along the mounting unit; and
   wherein the control unit is configured to enhance SLAM accuracy using the first SLAM index and the second SLAM index by moving the first one of the camera sensors physically to a specific position on the robot or by controlling the first one of the camera sensors such that the first one of the camera sensors faces a specific direction; and
   the robot repeatedly changes or sets the position or the direction of the first one of the camera sensors and determines whether an image captured by the first one of the camera sensors is appropriate for SLAM.

2. The robot of claim 1, wherein the mounting unit comprises a rail to which the camera sensor is coupled and which moves the camera sensor,
   the camera sensor is moved in a state in which the camera sensor is coupled to the mounting unit on the basis of control by the control unit.

3. The robot of claim 2, wherein a plurality of position sensing units configured to confirm a location of a camera sensor are disposed on the rail,
   when a camera sensor is disposed on a first position sensing unit, the control unit configures a location of the camera sensor using position information corresponding to the first position sensing unit.

4. The robot of claim 1, wherein the control unit calculates the SLAM indices on the basis of any one or more of a total number of 3D points in two or more images captured by the camera sensor, repeatability occurring in the two or more images, a true-matching ratio calculated in the images, and a false-matching ratio calculated in the images.

5. The robot of claim 1, wherein the control unit generates a first image corresponding to a first virtual camera sensor and a second image corresponding to a second virtual camera sensor by dividing the image captured by the camera sensor,
   the control unit generates SLAM indices respectively with respect to the first image and the second image.

6. The robot of claim 1, wherein the control unit changes the position of the camera sensor or weight of an image captured by the camera sensor on the basis of any one or more of a height of the ceiling, magnitude of illuminance, and speed of the robot in a space where the robot is moving, while the robot is moving.

7. The robot of claim 1, wherein the control unit divides a space in which the robot is moving into a first area and a second area, and differently generates a configuration of a camera sensor configured in the first area and a configuration of a camera sensor configured in the second area.

8. The robot of claim 1, comprising an interface unit configured to output position information of a camera sensor corresponding to the selected first SLAM index or the selected second SLAM index.

9. A robot which configures a camera position suitable for localization, comprising:
   a moving unit configured to move a robot;
   one or more camera sensors configured to capture images of a space in which the robot is moving:
      a mounting unit disposed on the robot and coupled with the camera sensor;
      a map storing unit configured to store map information such that the robot performs SLAM using images captured by the camera sensor;
      a control unit configured to change a position of a first one of the camera sensors or weight of an image captured by the first one of the camera sensors on the basis of any one or more of a height of the ceiling, magnitude of illuminance, and speed of the robot in a space where the robot is moving, while the robot is moving;
      wherein the control unit is configured to enhance SLAM accuracy using the first SLAM index and the second SLAM index by moving the first one of the camera sensors physically to a specific position on the robot or by controlling the first one of the camera sensors such that the first one of the camera sensors faces a specific direction; and
      the robot repeatedly changes or sets the position or the direction of the first one of the camera sensors and determines whether an image captured by the first one of the camera sensors is appropriate for SLAM.

10. The robot of claim 9, wherein the mounting unit includes a rail to which the camera sensor is coupled and which moves the camera sensor, the camera sensor is moved in a state in which the camera sensor is coupled to the mounting unit on the basis of control by the control unit.

11. The robot of claim 10, wherein a plurality of position sensing units configured to confirm a location of a camera sensor are disposed on the rail,
when a camera sensor is disposed on a first position sensing unit, the control unit configures a location of the camera sensor using position information corresponding to the first position sensing unit.

12. The robot of claim 9, wherein the map storing unit divides a space in which the robot is moving into a first area and a second area, and differently stores a configuration of a camera sensor configured in the first area and a configuration of a camera sensor configured in the second area,
when comparing pieces of map information stored in the map storing unit during SLAM, the control unit moves a position of the camera sensor coupled to the mounting unit in accordance with the configuration of the camera sensor stored in the map storing unit.

13. A method of configuring a camera position suitable for localization, comprising:
capturing images of a space in which a robot is moving by one or more camera sensors on a mounting unit onto which a plurality of camera sensors are mounted, or onto which a single camera sensor is movably mounted;
calculating a first SLAM index with respect to an image captured by a first one of the camera sensors on the mounting unit by a control unit of the robot;
calculating a second SLAM index with respect to an image captured by the first one of the camera sensors on the mounting unit by the control unit of the robot after moving the first one of the camera sensors along the mounting unit and changing a position of the first one of the camera sensors;
selecting any one of the first SLAM index and the second SLAM index by the control unit of the robot; and
wherein the robot enhances SLAM accuracy using the first SLAM index and the second SLAM index by moving the first one of the camera sensors physically to a specific position on the robot or controlling the first one of the camera sensors such that the first one of the camera sensors faces a specific direction; and
the robot repeatedly changes or sets the position or the direction of the first one of the camera sensors and determines whether an image captured by the first one of the camera sensors is appropriate for SLAM.

14. The method of claim 13, wherein the mounting unit includes a rail to which the camera sensor is coupled and which moves the camera sensor,
the method further comprises moving the camera sensor in a state in which the camera sensor is coupled to the mounting unit by the control unit.

15. The method of claim 14, wherein a plurality of position sensing units configured to confirm a location of a camera sensor are disposed on the rail,
the method further comprises configuring a location of a camera sensor using position information corresponding to a first position sensing unit by the control unit when the camera sensor is disposed on the first position sensing unit.

16. The method of claim 13, wherein the method further comprises calculating the SLAM indices on the basis of any one or more of a total number of 3D points in two or more images captured by the camera sensor, repeatability occurring in the two or more images, a true-matching ratio calculated in the images, and a false-matching ratio calculated in the images by the control unit.

17. The method of claim 13, further comprising:
generating a first image corresponding to a first virtual camera sensor and a second image corresponding to a second virtual camera senor by dividing an image captured by the camera sensor by the control unit; and
generating SLAM indices respectively with respect to the first image and the second image by the control unit.

18. The method of claim 13, wherein the method further comprises changing a position of the camera sensor or weight of an image captured by the camera sensor on the basis of any one or more of a height of the ceiling, magnitude of illuminance, and speed of the robot in a space where the robot is moving by the control unit, while the robot is moving.

19. The method of claim 13, wherein the method further comprises dividing a space in which the robot is moving into a first area and a second area, and differently generating a configuration of a camera sensor configured in the first area and a configuration of a camera sensor configured in the second area by the control unit.

20. The method of claim 13, wherein the method further comprises outputting position information of a camera sensor corresponding to the first SLAM index or the second SLAM index selected by the control unit by an interface unit of the robot.

* * * * *